(12) United States Patent
Louapre et al.

(10) Patent No.: US 9,328,508 B2
(45) Date of Patent: May 3, 2016

(54) PROCESS FOR PREPARING AN INSULATING MATERIAL

(75) Inventors: David Louapre, Newton, MA (US); Caroline Parneix, Rueil-Malmaison (FR); Veneta Grigorova, Guyancourt (FR); Jerome Gilles, Cambridge, MA (US)

(73) Assignee: SAINT-GOBAIN ISOVER, Courbevoie (FR)

( * ) Notice: Subject to any disclaimer, the term of this patent is extended or adjusted under 35 U.S.C. 154(b) by 122 days.

(21) Appl. No.: 13/993,968

(22) PCT Filed: Dec. 7, 2011

(86) PCT No.: PCT/FR2011/052887
§ 371 (c)(1),
(2), (4) Date: Jun. 20, 2013

(87) PCT Pub. No.: WO2012/080620
PCT Pub. Date: Jun. 21, 2012

(65) Prior Publication Data
US 2013/0260127 A1    Oct. 3, 2013

(30) Foreign Application Priority Data
Dec. 15, 2010    (FR) ...................................... 10 60588

(51) Int. Cl.
| | |
|---|---|
| *B29C 44/02* | (2006.01) |
| *E04B 1/80* | (2006.01) |
| *C04B 26/02* | (2006.01) |
| *C04B 26/06* | (2006.01) |
| *C04B 38/00* | (2006.01) |
| *B28B 1/00* | (2006.01) |

(52) U.S. Cl.
CPC ... *E04B 1/80* (2013.01); *B28B 1/00* (2013.01); *B29C 44/02* (2013.01); *C04B 26/02* (2013.01); *C04B 26/06* (2013.01); *C04B 38/00* (2013.01); *Y02B 30/94* (2013.01); *Y02W 30/94* (2015.05)

(58) Field of Classification Search
CPC ............ E04B 1/80; B29C 44/02; C04B 26/02
See application file for complete search history.

(56) References Cited

U.S. PATENT DOCUMENTS

2010/0119442 A1*  5/2010  Mueller et al. ................. 423/707
2011/0155019 A1   6/2011  Albright et al.

FOREIGN PATENT DOCUMENTS

| DE | 20 2010 005 9 | 10/2010 |
|---|---|---|
| EP | 1 892 226 | 2/2008 |
| WO | 03 097227 | 11/2003 |
| WO | 2010 002934 | 1/2010 |

OTHER PUBLICATIONS

International Search Report Issued Feb. 2, 2012 in PCT/FR11/052887 Filed Dec. 7, 2011.

* cited by examiner

*Primary Examiner* — Galen Hauth
(74) *Attorney, Agent, or Firm* — Oblon, McClelland, Maier & Neustadt, L.L.P.

(57) ABSTRACT

Process for manufacturing a thermally insulating material comprising the following steps:
   a) preparing an aqueous mixture of a solid mineral substance in suspension having a specific surface area S of greater than 5 m²/g;
   b) adding to the mixture at least one pore-forming agent;
   c) stirring so as to obtain a homogeneous mixture;
   d) preforming a substrate from the homogeneous mixture;
   e) optionally drying the substrate at least partially;
   f) removing, at least partially, the pore-forming agent;
and such that said specific surface area S, expressed in $m^2/g$ and measured by BET, and the mean particle diameter Dpm of the pore-forming agents, expressed in micrometers and measured by dynamic light scattering, obey the relation:

$$1/S < Dpm < 50/S.$$

11 Claims, No Drawings

PROCESS FOR PREPARING AN INSULATING MATERIAL

CROSS REFERENCE TO RELATED APPLICATIONS

The present application is a 35 U.S.C. §371 national stage patent application of International patent application PCT/FR2011/052887, filed on Dec. 7, 2011, published as WO 2012/080620 on Jun. 21, 2012, the text of which is incorporated by reference, and claims the benefit of the filing date of French application no. 1060588, filed on Dec. 15, 2010, the text of which is also incorporated by reference.

The present invention relates to a process for manufacturing a thermally insulating material, to the thermally insulating material capable of being prepared according to the manufacturing process, and also to the use thereof for the insulation of buildings and in particular as an insulation panel.

Currently, in new builds and in renovation, in order to meet these specifications of building and public works (BPW) structures, it is advantageous to develop novel materials that are particularly efficient in terms of thermal insulation. It is essential that such more insulating construction materials retain, or even improve, the properties desired for the construction of buildings, especially in terms of lightening of the load, mechanical strength, or sound insulation, and that they be easy to produce industrially in order to reduce the costs and optimize the production output rates.

A wide variety of thermally insulating products is known. Among these, mention may mainly be made of insulating materials based on natural or synthetic fibers, such as glass wool or rock wool, cellular insulating materials of the expanded or foamed polymer type such as extruded or expanded polystyrene (EPS), or else phenyl or polyurethane (PU) foams. Cellular insulating materials may advantageously incorporate a gas with a lower thermal conductivity than air in order to achieve thermal performances close to 30 mW/(m·K) at room temperature. One drawback of these materials is the difficulty of retaining the low conductivity gas within the matrix over time, and the material loses, by aging, some of these thermal performances.

It is also possible to use porous or microporous materials in which a partial vacuum has been created, to result, for example, in vacuum panels. These insulating materials are difficult to use because they undergo degradations of their insulating property during their conversion (cutting, perforation, etc.).

According to U.S. Pat. No. 4,636,415 and U.S. Pat. No. 4,159,359, the use of precipitated or pyrogenic silica particles for the manufacture of insulating (refrigerator, etc.) walls is also known. These documents describe methods of preparing materials based on silica in powder form via a dry route, and which require in particular a dry compaction step. Such methods make it difficult to incorporate adjuvants or additives necessary for the forming of the final material and for the improvement of its thermal and mechanical properties, and are not suitable for a building application.

The use of silica aerogel particles for the manufacture of high-performance insulating products is also known. Silica aerogels, which may obtain low thermal conductivities ranging down to 12 mW/(m·K) at room temperature, are generally produced from a silica gel dried under particular conditions. They may be in the form either of translucent granules, or of fine powders which require specific forming steps in order to integrate them into conventional insulating products such as (thermal, acoustic, etc.) insulating panels for insulating the internal and external walls of buildings. These silica aerogels are difficult and costly to obtain on the industrial scale, in particular because they require delicate drying conditions. There is therefore a high demand for developing comparable materials in terms of thermal performance, but that are easier to manufacture industrially.

The present invention aims to propose a process for manufacturing a novel insulating material having very good thermal performances. This material must be able to be used in applications as building insulation. The present invention also aims to propose a process for manufacturing a material that is easy to use and is capable of being shaped into any shape desired, especially by casting onto a support or by molding. Furthermore, the process must be compatible with an incorporation of compounds such as binders, additives and/or adjuvants, in liquid, gel and/or solid form.

In this regard, and in order to overcome the drawbacks of the prior art, the present invention relates, according to a first aspect, to a process for manufacturing a thermally insulating material comprising the following steps:

a) preparing an aqueous mixture of a solid mineral substance in suspension having a specific surface area S of greater than 5 m²/g;
b) adding to the mixture at least one pore-forming agent;
c) stirring so as to obtain a homogeneous mixture;
d) preforming a substrate from the homogeneous mixture;
e) optionally drying the substrate at least partially;
f) removing, at least partially, the pore-forming agent;

and such that said specific surface area S, expressed in m²/g and measured by BET, and the mean particle diameter Dpm of the pore-forming agents, expressed in micrometers and measured by dynamic light scattering (or light dynamic diffusion), obey the relation:

$$1/S < Dpm < 50/S.$$

The term "preformed" within the context of the process of the invention described above corresponds to an intermediate form of the product during the course of this manufacturing process. At the end of the process, the product obtained may be able to be used as is or undergo other forming steps such as at least one cutting, milling, compression, etc.

The substrate is dried at least partially in step e), that is to say that at least 30% or at least 50% of the water is removed from the substrate, preferably at least 70%, advantageously 80%, or 90% and even at least 99% of the water is removed from the substrate. Steps e) and f) may be carried out in any order, preferably step f) follows step e). Step e) may be included in step f), that is to say that the drying may take place during the pore-forming agent removal step.

The mineral substance and the pore-forming agent within the context of the invention as described previously are preferably chosen such that 3/S<Dpm<30/S, and advantageously 5/S<Dpm<15/S.

The specific surface areas are measured by BET (theory of multiple adsorption of gases using Brunaer, Emmett and Teller determinations) in accordance with the standard ISO 9277: 2010, in the case of precipitated silicas the measurements are made in accordance with the standard ISO 5794/1: 2010.

Within the context of the invention, the pore-forming agents are substantially spherical, the Dpm of their size distribution then corresponds to their mean particle diameter and is measured according to the standard ISO 13321: 1996 by dynamic light scattering.

The term "mineral substance" within the meaning of the present invention denotes any solid material formed of inorganic molecules, for example based on a metal oxide, which may be used directly starting from a raw material or prepared from inorganic precursors.

The mineral substance in suspension described previously in the process of the invention is a powder, the particle size of which preferably varies from 1 μm to 10 mm for the median diameter D50 measured by particle size analysis via laser diffraction according to the standard ISO 13320-1: 2000.

The specific surface area S of the mineral substance described in step a) is preferably greater than 10 m$^2$/g, more preferably it is greater than 20 m$^2$/g, and advantageously it is greater than 30 m$^2$/g, more advantageously it is greater than 40 m$^2$/g, or even greater than 50 m$^2$/g. Advantageously, this specific surface area S of the mineral substance is greater than 60 m$^2$/g, more preferably it is greater than 70 m$^2$/g, more advantageously it is greater than 80 m$^2$/g, and more preferably still it is greater than 90 m$^2$/g, or even greater than 100 m$^2$/g.

The expression "pore-forming agent" within the context of the present invention denotes any substance capable of generating the porosity within a material, especially using a treatment subsequent to the insertion of this agent at the heart of the material, in order to at least partially remove it.

The pore-forming agent may be partially removed, for example 90% of the mass of the pore-forming agent is removed from the substrate; so that when an excessively large amount of the pore-forming agent is added in step b) relative to the amount needed to obtain the expected effect, this is corrected by removing only the mass that is of use for obtaining this effect.

The inventors have unexpectedly demonstrated that the process of the invention, owing to the at least partial removal of the pore-forming agents within the substrate, makes it possible to improve the thermal properties of the material. Specifically, a mineral substance put into suspension and dried according to the process of the invention, but without the incorporation of pore-forming agent (and consequently without step b)), in order to result in the substrate which will be denoted by reference substrate within the context of the invention, has only a thermal conductivity λ of the order of 50 to 90 mW/(m·K) at room temperature. The addition, in solution, of a pore-forming agent, the size of which is connected to the specific surface area of the mineral substance according to the relation as specified previously, and its at least partial removal after drying, makes it possible to obtain a substrate having a thermal conductivity that is considerably reduced, and becomes less than 45 mW/(m·K). Within the context of the invention, the thermal conductivities were measured with an HFM 436 series flowmeter from the company NETZSCH™ by following the protocols established by the standards ASTM C518 and ISO 8301.

Besides the improved thermal properties, additional ingredients can easily be added homogeneously in the aqueous phase, and the forming of the insulating material is simple. Such a process thus makes it possible to manufacture a wide variety of highly insulating materials based on a mineral matrix combined with quite a range of ingredients, in order to cover a wide range of insulation applications, in particular in the building field.

The improvement in the thermal conductivity is attributed largely to the increase in the pore volume relative to the reference material. The addition of porosity is carried out by addition of pore-forming agents around which the aggregates of mineral substance come to be structured, the removal of the pore-forming agents leads to the formation of the porosity in a controlled manner in order to lower the thermal conductivity of the mineral material obtained.

The stirring (step c)) serves to completely disperse the mineral substance and to homogenize the mixture with the pore-forming agents, it may be carried out mechanically using, for example, any mechanical stirrer such as a magnetic stirrer bar or a stirrer blade. Alternatively, or in combination, sonication may preferably be applied in order to deagglomerate and/or disperse and put into suspension the mineral substance.

Preferably, the weight ratio of the mineral substance relative to the pore-forming agent has a value which is from 0.2 to 3. Advantageously, the weight ratio of the mineral substance relative to the pore-forming agent is from 0.7 to 2.5. More advantageously, the weight ratio of the mineral substance relative to the pore-forming agent is from 1 to 2.

Preferably, in combination with the weight ratios listed above, at least 10% of the mass of the pore-forming agent is removed in step f). Similarly, preferably at least 30%, advantageously at least 50%, more preferably still at least 90% and even at least 99% of the pore-forming agent is removed in step f).

When it is a question of an emulsion, the mass of the pore-forming agent will be expressed relative to the solids content.

Preferably, the mineral substance is chosen from at least one of the following substances: at least one silicate, at least one amorphous silica such as a precipitated silica, a pyrogenic silica, a fumed silica, a silica gel or a silica aerogel, at least one carbonate and at least one clay.

Silicates and carbonates of choice as mineral substance are silicates and carbonates of an alkali metal or of an alkine-earth metal, and preferably will be calcium carbonate and/or magnesium carbonate.

Preferably, the mineral substance is an amorphous silica. Among the amorphous silicas, precipitated silica and/or pyrogenic silica (such as the pyrogenic silica sold by the company Wacker™ under the reference HDK®T30) are preferred.

Preferably, the amorphous silica presented above within the context of the invention is a precipitated silica. Use will advantageously be made of the precipitated silica sold under the reference Tixosil®365 by the company Rhodia™ having a specific surface area of 160 m$^2$/g measured by BET in accordance with the standard ISO 5794/1: 2010.

The precipitated silica is obtained by acidification of a sodium (or other alkali metal) silicate solution in a stirred and heated aqueous medium. Primary particles of silica grow up to a size from 4 to 50 nm which coagulate into aggregates through the effect of the sodium ions originating from the silicate, the stirring (or the sonication) of the mixture having the effect of preventing the formation of a gel. The suspension of precipitated silica thus produced is washed of soluble salts, then filtered and the filter cake is dried (especially by spray drying or rotary drying), then the solid obtained can be milled and the particles separated according to their size.

The pore-forming agent may comprise substantially spherical particles comprising essentially, or even uniquely, at least one organic material preferably in colloidal form, for example an organic polymer in colloidal form. As organic material, use may also be made of starch particles, such particles are described in application EP 1 403 231.

The pore-forming agent may also be an assembly formed from surfactants, polymers such as ampliphilic block copolymers, or else an inorganic pore-forming agent.

As an inorganic pore-forming agent, mention may be made, for example, of inorganic salts (in possible combination with an organic polymer), of the NaCl type, incorporated into the aqueous mixture preferably containing a cosolvent, for example ethanol. The inorganic salts are subsequently removed by washing as explained, for example, in the document *Chem. Mater.* 1999, 11, 1174-1178.

Use will advantageously be made of any type of pore-forming agent formed from a material having a calcination temperature that is below the melting point and/or sintering temperature of the mineral substance in which it is enclosed. Typically, in the case of precipitated silicas, the calcination temperature of the pore-forming agent must be below 700° C.

Preferably, the pore-forming agent is at least one organic particle. Such an organic particle is constituted mainly, or even uniquely, of an organic material. Such organic particles may be completely or partly constituted of polymers such as ampliphilic block copolymers, also known as stereoregular block polymers, comprising AB or ABA blocks, in which A represents a hydrophilic block such as polyethylene oxide (PEO) or polyacrylic acid (PAA) and B a hydrophobic block such as polystyrene (PS), polypropylene oxide (PPO), polyisoprene (PI) or polyvinylpyridine (PVP).

Preferably, the organic particle used in the process for manufacturing the insulating material according to the invention is a latex particle.

The term "latex" within the present invention denotes a colloidal suspension or dispersion of polymers and/or of particles constituted of macromolecules, such a definition of the term latex is given, for example, in "*les latex synthétiques [Synthetic latices]*", published by Lavoisier, J-C Daniel et al., page 15".

The polymer (and/or copolymer) cited above may be self-emulsifiable or else the emulsion or the dispersion is stabilized by suitable surfactants. The polymer and/or copolymer is present in a weight fraction between 5% and 75%, preferably 20% and 60%, and advantageously 30% and 50% by total weight of the emulsion or of the dispersion. A latex that is preferred within the context of the present invention advantageously has a glass transition temperature $T_g$ of greater than 50° C. Ideally, the $T_g$ must be between 50° C. and 200° C., preferably between 70° C. and 170° C., advantageously between 90° C. and 150° C., or even between 105° C. and 135° C. Use may advantageously be made of a combination of several latices having glass transition temperatures as specified above within the context of the present invention.

Advantageously, the latex contains a polymer or copolymer of vinyl type, of acrylic type and/or of the type derived from carboxylic acid. Latices of acrylic type are very particularly preferred, in particular that contain a polymer of acrylic type, especially an acrylonitrile/acrylic ester copolymer or a styrene/acrylic acid or ester copolymer that is silanized (i.e. copolymerized with an ethylenically unsaturated monomer bearing at least one silane or silanol function).

Other advantageous latices may be chosen from those comprising ester functions or comprising copolymers of silanized or unsilanized olefin and vinyl chloride. Mention may especially be made of latices based on vinyl acetate, in particular based on a homopolymer of polyvinyl acetate, or on a copolymer of vinyl acetate and in particular of (meth)acrylic acid and/or ester, of maleic ester, of olefin and/or of vinyl chloride, or based on a vinyl chloride/ethylene copolymer.

Mention may be made of the commercial latices that can be used as pore-forming agent in the process of the invention, such as the polyurethane Baybond®—BAYBOND XP 2602 having a mean particle diameter of 135 nm sold by the company Bayer™. Alternatively, or in combination, it is also possible to use latices in the form of oxidized or non-oxidized polyethylene wax, optionally in combination with an acrylic copolymer, and having a mean particle diameter from 60 to 75 nm, such as those sold by Rohm and Haas' from the company Dow Chemical™.

The latex could be a styrene/acrylic copolymer, or an entirely acrylic copolymer (derived from various acrylic monomers) obtained by radical polymerization in emulsion or dispersion. Such polymers are sold by the company BASF™ in the range referenced by the name Acronal®.

Preferably, the latex is selected from at least one water-dispersible acrylic copolymer, the glass transition temperature of which varies from 50° C. to 200° C., and the acrylic copolymer is in emulsion in water at a weight fraction between 5% and 75% of the total weight of the pore-forming agent. As explained previously, within the context of the present invention, when it is an emulsion, the mass of the pore-forming agent will be expressed relative to the solids content.

Such a latex is preferably chosen from an acrylic copolymer sold under the reference Neocryl® by the company DSM™, and advantageously it is Neocryl® XK-52.

This product is in the form of an emulsion in water and comprises latex particles having a diameter that varies from 30 to 100 nm with a mean particle diameter of 58 nm. It has a glass transition temperature $T_g$ of 124° C. and is dispersed (water-dispersible polymer) in water at pH=5.1 at a weight fraction (or solids content) of 40%. In the same product range, it is possible to use other latices such as Neocryl® BT 21 having a mean particle diameter of 44 nm or Neocryl® BT 100 having a mean particle diameter of 88 nm.

It is also possible to prepare such acrylic copolymers, having a diameter in particular between 30 nm and 80 nm, by emulsion polymerization of methyl methacrylate (MMA). These polymers are prepared via a radical route in emulsion which generally takes place in three distinct stages: a stage of seeding of the particles followed by a stage of growth of the size of the particles by consuming the monomer and finally a termination stage. The precise details of the formulations and of the experimental procedure are presented later in the experimental section. The syntheses were carried out at 70° C. in a jacketed reactor equipped with a mechanical stirrer. In a first stage, the dispersant (deionized water) and the surfactant (Disponil® FES 32 sold by the company Cognis™ or sodium dodecylsulfate (SDS)) are introduced into the reactor in order to undergo degassing by nitrogen bubbling, and are heated at the reaction temperature. This degassing is necessary since the dissolved oxygen is a radical scavenger. After about 15 minutes, the monomer (MMA) and the initiator (ammonium persulfate $S_2O_8^{2-}$, $2NH_3^+$) are introduced in one go into the reactor with vigorous stirring. The reaction medium instantaneously becomes cloudy due to the formation of drops of MMA and the polymerization begins. After a few minutes, the primary particles are formed, and the reaction medium takes on an opaque white coloring due to the scattering of the light by the polymer beads.

The progress of the reaction is followed both by dynamic light scattering in order to observe the stabilization of the size of the beads, and by measuring the solids content in the dispersion in order to measure the mass of MMA that has polymerized. The polymerization is generally completed after a few hours. The reactor is then emptied, and the latex is stored at room temperature.

As the pore-forming agent, it will also be possible to use any possible combination of the aforementioned latices, optionally taken together with at least one associative structure formed from surfactants or ampliphilic block copolymers and/or at least one inorganic pore-forming agent.

As explained above in the description, the term "preformed" within the context of the process of the invention, corresponds to an intermediate forming of the product during the course of this manufacturing process.

Advantageously, the substrate is preformed by molding, extrusion or deposition on a conveyor.

This step, which consists in preforming the substrate by molding, may comprise operations for casting the homogeneous mixture into cavities of suitable shape or cross section. The term molding should be taken in its broad sense and encompasses any type of shaping operation, such as casting in an open mold, extrusion through a die and cutting of the extrudate, etc. Where appropriate, the shaping operation may be carried out by coextrusion of the preparation with a polymeric organic phase in order to produce a surface layer. The deposition onto a conveyor may make it possible to shape the substrate continuously in the form of a strip or sheet which is able to be treated according to the subsequent steps of the process.

It is possible to dry the substrate, in step e), by leaving it to rest at room temperature for several hours. Preferably, the substrate is dried for at least one week in a climatic chamber at a temperature greater than or equal to 35° C. with a relative humidity of more than 80%.

After step e) and before step f), it is optionally possible to reduce the substrate to powder and/or to compress it. This additional forming step preferably consists firstly of a milling carried out using a pestle in a mortar, which is followed by a compression preferably carried out by a press adjusted so as to exert a pressure of $15.10^6$ Pa on the powder. Such a compression makes it possible to overcome the problem of disintegration of the material that frequently takes place following steps that consist in preforming and/or drying the substrate.

Alternatively, it is possible to simply reduce the substrate to powder in order to obtain an insulating material after removal of the pore-forming agents.

Step f) of the manufacturing process according to the invention is preferably carried out by calcination. This calcination step comprises at least one temperature rise in order to reach a temperature hold between 350° C. and 750° C., the temperature is maintained for, in particular, at least 4 hours and then left to return to room temperature.

Preferably, for the calcination step, starting from material obtained in step e), it is carried out successively as follows:
  the temperature rise is performed over a time interval varying between 2 and 6 hours in order to reach a temperature hold between 80° C. and 120° C., the temperature is maintained for 4 to 8 hours; then
  a temperature rise is performed over a time interval varying between 4 and 8 hours in order to reach a temperature hold between 150° C. and 200° C., the temperature is maintained for 4 to 8 hours; then
  a temperature rise is performed over a time interval varying between 9 and 15 hours in order to reach a temperature hold between 350° C. and 550° C., the temperature is maintained for at least 4 hours;
  then it is left to return to room temperature.

It is preferred to increase the temperature by proceeding according to three holds in order to avoid thermal shocks which reduce the cohesion of the material forming the substrate, and degrade its thermal insulation properties.

The present invention also relates to a thermally insulating material which may be obtained according to the process described previously and the matrix of which is formed from a mineral substance, preferably silica, having a total pore volume between 1.3 and 2.2 cm³/g, advantageously this pore volume is less than 1.9 cm³/g, and more preferably still the total pore volume of the thermally insulating material according to the invention is between 1.45 and 1.85 cm³/g. The total pore volume is determined by mercury porosimetry measurements carried out on Pascal 140 and Pascal 240 machines (Thermo Scientific®) and is considered to be equal to the cumulative volume of mercury introduced into the samples during these tests.

As described previously, the thermal conductivities within the context of the invention are measured with an HFM 436 series flowmeter from the company NETZSCH™ by following the protocols established by the standards ASTM C518 and ISO 8301.

Preferably, the thermal conductivity λ of the thermally insulating material is less than 55 mW/(m·K), advantageously it is less than 45 mW/(m·K), and more preferably it is less than 40 mW/(m·K).

Preferably, the thermal conductivity λ of the thermally insulating material is less than 37 mW/(m·K), more preferably it is less than 35 mW/(m·K), advantageously it is less than 32 mW/(m·K), or even it is less than 30 mW/(m·K).

Preferably, the density of the insulating material of the invention is between 300 and 500 kg/m³, and advantageously the density of the material is between 350 and 480 kg/m³.

Preferably, the pore volume of the material for the pores having a diameter of less than or equal to 100 nm varies from 1 to 1.3 cm³/g, the pore volume for the pores having a diameter of greater than 100 nm and less than or equal to 1000 nm varies from 0.15 to 0.35 cm³/g and the pore volume for the pores having a diameter of greater than 1000 nm varies from 0.27 to 0.50 cm³/g. The pore volumes are obtained by mercury porosimetry with the equipment described in the experimental section. The pore diameters are calculated using the Washburn equation (Washburn, 1921) by assuming the surface tension of the mercury is equal to 480 dyn/cm and the silica/mercury contact angle is equal to 140°.

The present invention also relates to a use of the insulating material as described previously within the context of the invention, in the field of construction, for insulating the walls of buildings. The inventors have observed that during the use of a latex as pore-forming agent, it was possible to calcine the material obtained preferably in the form of silica sheets. Such sheets are advantageously cut, or else the insulating material is molded, in order to form panels, and the core porosity is generated in a controlled manner in a material having a thickness of several millimeters.

Preferably, the insulating material is in the form of a panel, the thickness of which is at least equal to 5 mm.

The insulating material according to the invention may be combined with a fiber matrix or with a foam such as a polyurethane foam, in order to reinforce the mechanical strength of the insulating panel thus formed.

Such fibers may act as reinforcement in the sense that they form a fibrous network capable of retaining the silica aggregates and are reinforcing elements that improve the mechanical strength of the matrix.

The present invention and the advantages thereof will be better understood on reading the examples described in the experimental section which follows, that are given solely by way of illustration and which cannot in any case be considered to be limiting.

Experimental Section
General Points (Analysis Methods and Equipment Used)
The Thermal Conductivities They were measured with an HFM 436 series flowmeter from the company NETZSCH™ by following the protocols established by the standards ASTM C518 and ISO 8301.

Protocol for the Pelletizing, by Compression at 15.10⁶ Pa, of the Powders:

Equipment and apparatus needed: INSTRON 4505 press equipped with a 100 kN load cell and a SEFRAM digital recorder; a set of cylinders and pistons with a diameter of 50 mm made of steel comprising a hollow cylinder and two pistons (one short and one long) one of the two surfaces being polished, and also a second hollow cylinder having a diameter slightly greater than 50 mm in order to release the piston after compression in order to recover the silica pellet formed; a small metal plate having a thickness of 10 mm; a steel bead having a diameter of 56.6 mm; a precision balance (precision±0.001 g); a micrometer (precision±0.01 mm).

Protocol for Obtaining Wafers, by Compression at 15.10⁶ Pa, of the Powders:

For samples having dimensions of 15×15×5 cm, a 3400 KN ZWICK press is used.

Measurement of the Densities and of the Dimensions of the Samples (Pellets):

Measure the mass of the pellet on the balance used within the context of the pelletizing; measure the thickness of the pellet with the micrometer; calculate the average density of the pellet from its mass and its thickness.

Dimensions of the pellets prepared by the INSTRON 4505 press: in all cases: diameter 50 mm, thickness 7 to 8 mm.

Specific Volume: the total pore volume is determined by mercury porosimetry measurements carried out on Pascal 140 and Pascal 240 machines (Thermo Scientific®) and is considered to be equal to the cumulative volume of mercury introduced into the samples during these tests.

The pore diameters can be calculated using the Washburn equation by assuming the surface tension of the mercury is equal to 480 dyn/cm and the silica/mercury contact angle is equal to 140°.

Protocol for Preparing Latices

Introduced into a one-liter jacketed reactor, thermostatically controlled at 70° C., equipped with a mechanical stirrer, a condenser and an inlet for nitrogen bubbling are 600 g of deionized water (resistivity>16 MΩ·m) and the surfactant (solid or in solution in water). At the same time, methyl methacrylate (MMA, 99%, Aldrich) and the initiator diluted in a small amount of water (withdrawn from the 600 g) are placed in separate flasks equipped with folding skirt stoppers. The contents of the reactor and also that of the two flasks are deaerated for 15 min by nitrogen bubbling. The monomer and the polymerization initiator are then introduced in one go into the reactor under mechanical stirring (250 rpm). The entire reaction is carried out in a sealed reactor, with the stream of nitrogen maintained just above the reaction medium. The reaction medium becomes cloudy immediately after the addition of the monomer due to the formation of monomer droplets. After a few minutes, the medium takes on a white coloring, a sign of light scattering by the particles already formed. The progress of the reaction is followed by dynamic light scattering in order to monitor the change in the size distribution of the articles, and by measuring the solids content of the dispersion in order to measure the degree of conversion of the monomer. When the polymerization reaches its maximum, the reactor is drained, and the latex kept in a polyethylene flask under no particular conditions. The shelf life of the dispersions thus synthesized varies between 6 months and one year. The anionic surfactant used is generally Disponil® FES 32 sold by the company Cognis™, the molecular formula of which is $C_{12}H_{25}(OCH_2CH_2)_4SO_4^-Na^+$, having a critical micelle concentration of 0.26 g/L and in the form of a 32% by weight solution in water. SDS (sodium dodecylsulfate) of molecular formula $C_{12}H_{25}SO_4^-Na^+$ sold by Aldrich™ and having a critical micelle concentration of 2 g/L may be used in place of the Disponil®. The initiator is ammonium persulfate $S_2O_8^{2-}$, $2NH_4^+$ (APS). Tables 1 and 2 summarize the amounts of reactants used and the results of the experimental analyses carried out on two latices prepared according to this protocol:

TABLE 1 latex A having a Dpm of 73 nm
(reaction time: 3 hours 40 minutes)

|  | Mass (g) |
| --- | --- |
| Water | 600 |
| Disponil ® FES 32 | 11.1 |
| APS | 0.81 |
| MMA | 162.7 |

The Dpm, which corresponds to the mean particle diameter of the latex particles is 73 nm and its polydispersity index Ip is 0.051, the Dpm and the Ip are both measured according to the standard ISO 13321: 1996 (dynamic light scattering).

The solids content by weight Ts is 22% and the conversion is 1 (the solids content is measured by drying the latex in an oven at a temperature below the carbonization temperature of the polymer).

TABLE 2 latex B having a Dpm of 58 nm
(reaction time: 3 hours)

|  | Mass (g) |
| --- | --- |
| Water | 600 |
| Disponil ® FES 32 | 30.2 |
| APS | 2.404 |
| MMA | 160.2 |

The Dpm which corresponds to the mean diameter of the particles for this latex is 58 nm and its polydispersity index Ip is 0.054, the Dpm and the Ip are both measured according to the standard ISO 13321: 1996.

The solids content by weight Ts is 22% and the conversion is 1.

EXAMPLES

Example 1a

Comparative Example (Reference Substrate)

65 g of Tixosil® 365 precipitated silica, having a specific surface area, measured by BET in accordance with standard ISO 5794/1: 2010, of 160 m²/g are dispersed in 310 g of distilled water by sonication for min using a Vibracell 75042 machine (Bioblock Scientific) (power: 500 W, frequency: 20 kHz). The dispersion obtained is then poured into PTFE evaporating bowls (Carl Roth) having an internal diameter of 9.5 cm and dried for one week in a climatic chamber at 40° C. and 90% relative humidity. After drying, the solid samples extracted from the bowls are milled using a mortar, then the powder obtained is formed by compression at 15.10⁶ Pa with the equipment (INSTRON 4505 press) described above in the general points of the experimental section.

This substrate obtained in pellet form is subjected to the following heat treatment:
 rise to 100° C. over 4 hours (0.31° C./min) then hold for 6 hours at 100° C.;

rise to 175° C. over 6 hours (0.21° C./min) then hold for 6 hours at 175° C.;
rise to 450° C. over 12 hours (0.31° C./min) then hold for 8 hours at 450° C.;
return to room temperature.

The pellet, after calcination, still has the same dimensions, namely 50 mm in diameter for a thickness of 7-8 mm, the pellet obtained at the end of this treatment has a density measured as explained in the general points of the experimental section, and listed in table 3.

The thermal conductivity measured according to the protocol described in the general points, and the pore volume measured by mercury intrusion porosimetry are also listed in table 3.

Example 2a

Around 10% (Weight Percentage) of Dry Latex are Used Relative to the Mass of Precipitated Silica Used 65 g of Tixosil® 365 precipitated silica, having a specific surface area, measured by BET in accordance with standard ISO 5794/1: 2010, of 160 m$^2$/g are dispersed in 280 g of distilled water by sonication for 5 min (power: 500 W, frequency: 20 kHz) using a Vibracell 75042 machine (Bioblock Scientific). Next, 30 g of latex B having a mean particle diameter of 58 nm (table 2) are added. The dispersion obtained is then poured into PTFE evaporating bowls (Carl Roth) having an internal diameter of 9.5 cm and dried for one week in a climatic chamber at 40° C. and 90% relative humidity. After drying, the solid samples extracted from the bowls are milled using a pestle in a mortar, then the powder obtained is pelleted by compression at 15.10$^6$ Pa with the equipment (INSTRON 4505 press) described above in the general points of the experimental section.

This substrate obtained in pellet form is subjected to the following heat treatment:
rise to 100° C. over 4 hours (0.31° C./min) then hold for 6 hours at 100° C.;
rise to 175° C. over 6 hours (0.21° C./min) then hold for 6 hours at 175° C.;
rise to 450° C. over 12 hours (0.31° C./min) then hold for 8 hours at 450° C.;
return to room temperature.

The pellet, after calcination, still has the same dimensions, namely 50 mm in diameter for a thickness of 7-8 mm, the pellet obtained at the end of this treatment has a density measured as explained in the general points of the experimental section, and listed in table 3.

The thermal conductivity measured according to the protocol described in the general points, and the pore volume measured by mercury intrusion porosimetry are also listed in table 3.

Example 3a

Around 30% (Weight Percentage) of Dry Latex are Used Relative to the Mass of Precipitated Silica Used The experimental protocol from example 2a was repeated still working with the same amount of Tixosil® 365 precipitated silica, but this time with 90 g of latex B (table 2). It was topped up with distilled water so as to obtain a dispersion in 310 g of distilled water.

Likewise, the experimental results are collated in table 3.

Example 4a

Around 50% (Weight Percentage) of Dry Latex are Used Relative to the Mass of Precipitated Silica Used The experimental protocol from example 2a was repeated still working with the same amount of Tixosil® 365 precipitated silica, but this time with 150 g of latex B (table 2). It was topped up with distilled water so as to obtain a dispersion in 310 g of distilled water.

Likewise, the experimental results are collated in table 3.

Example 5a

Around 70% (Weight Percentage) of Dry Latex are Used Relative to the Mass of Precipitated Silica Used The experimental protocol from example 2a was repeated still working with the same amount of Tixosil® 365 precipitated silica, but this time with 210 g of latex B (table 2). It was topped up with distilled water so as to obtain a dispersion in 310 g of distilled water.

Likewise, the experimental results are collated in table 3.

Examples 6a, 7a, 8a and 9a

For examples 6a, 7a, 8a and 9a, the protocol described respectively for examples 2a, 3a, 4a and 5a is repeated by replacing the latex B (from table 2) containing 22% by weight of solids, with the suspension of the Neocryl® XK-52 latex sold by the company DSM™ containing 40% by weight of solids. It is topped up with an amount of distilled water that is added in order to obtain a suspension in 310 g of water and the process is carried out in the same way as explained above in example 2a in order to obtain a calcined pellet which corresponds to one embodiment of the insulating material of the invention.

For the examples 6a, 7a, 8a and 9a, the same experimental results as those obtained for examples 2a, 3a, 4a and 5a are respectively obtained.

Examples 1a to 9a which were repeated, by multiplying the amounts of reactant and of solvent by 12 and by repeating the same procedure, correspond respectively to examples 1b to 9b. For these examples 1b to 9b, samples (wafers) having dimensions of 15×15×5 cm are obtained with compression in the ZWICK 3400 KN press, then calcination. For the samples having these dimensions, the calcination protocol is the same, except that the last hold is 550° C. and is maintained for 10 hours.

The results obtained for examples 1a,b to 9a,b are presented below in table 3:

TABLE 3

|  | Examples 1a, b (comparative examples) | Examples 2a, b and 6a, b Silica/(dry) latex ratio: 9 | Examples 3a, b and 7a, b Silica/(dry) latex ratio: 3.4 | Examples 4a, b and 8a, b Silica/(dry) latex ratio: 2 | Examples 5a, b and 9a, b Silica/(dry) latex ratio: 1.4 |
|---|---|---|---|---|---|
| Thermal conductivity (mW/(m · K)) | 51 | 45 | 45 | 39 | 36 |
| Density (g/cm$^3$) | 570 | 490 | 440 | 410 | 370 |
| Pore volume (cm$^3$/g) | 1.2 | — | 1.5 | — | 1.7 |

The invention claimed is:

1. A process for manufacturing a thermally insulating material, the process comprising:
    a) preparing an aqueous mixture of a solid mineral substance in suspension having a specific surface area S of greater than 5 m$^2$/g;
    b) adding at least one pore-forming agent comprising particles, to the aqueous mixture, to obtain an intermediate mixture;
    c) stirring the intermediate mixture, to obtain a homogeneous mixture;
    d) preforming a substrate from the homogeneous mixture;
    e) optionally, drying the substrate at least partially;
    f) removing, at least partially, the pore-forming agent;
    wherein a specific surface area S, expressed in m$^2$/g and measured by BET, and a mean particle diameter Dpm of the particles of the at least one pore-forming agent, expressed in micrometers and measured by dynamic light scattering, satisfy the relation:

$1/S < Dpm < 50/S$.

2. The process of claim 1, wherein the specific surface area S and the mean particle diameter Dpm of the pore-forming agents satisfy the relation:

$3/S < Dpm < 30/S$.

3. The process of claim 1, wherein the weight ratio of the mineral substance relative to the pore-forming agent is from 0.2 to 3.

4. The process of claim 1, wherein the mineral substance is at least one selected from the group consisting of a silicate, an amorphous silica, a carbonate, and a clay.

5. The process of claim 1, wherein the mineral substance is at least one selected from the group consisting of precipitated silica and pyrogenic silica.

6. The process of claim 1, wherein the pore-forming agent is at least one synthetic latex particle.

7. The process of claim 1, wherein the pore-forming agent is at least one water-dispersible acrylic copolymer having a glass transition temperature in a range from 50° C. to 200° C., wherein the acrylic copolymer is in emulsion in water at a weight fraction between 5% and 75% of the total weight of the pore-forming agent.

8. The process of claim 1, wherein, during the preforming d), the substrate is preformed by molding, extrusion, or deposition on a conveyor.

9. The process of claim 1, wherein the removing f) comprises at least one temperature rise in order to reach a temperature hold between 350° C. and 750° C., the temperature is maintained for, in particular, at least 4 hours and then left to return to room temperature.

10. The process of claim 1, wherein the weight ratio of the mineral substance relative to the pore-forming agent is from 0.7 to 2.5.

11. The process of claim 1, wherein the mineral substance is at least one selected from the group consisting of a precipitated silica, a pyrogenic silica, a fumed silica, a silica gel and a silica aerogel.

* * * * *